United States Patent [19]

Burns

[11] Patent Number: 5,137,236
[45] Date of Patent: Aug. 11, 1992

[54] TRIPOD

[76] Inventor: James E. Burns, 4221 NE. 25th Ave., Lighthouse Point, Fla. 33064

[21] Appl. No.: 741,786

[22] Filed: Aug. 6, 1991

[51] Int. Cl.$^5$ ............................................. F16M 11/38
[52] U.S. Cl. ......................................... 248/171; 248/169; 248/188.6
[58] Field of Search ................ 248/125, 408, 166, 168, 248/169, 170, 171, 188.6, 188.3

[56] References Cited

U.S. PATENT DOCUMENTS

| 23,428 | 3/1859 | Lewis | 248/171 |
|---|---|---|---|
| 1,008,545 | 11/1911 | Humphrey | 248/171 |
| 1,175,352 | 3/1916 | Hand | 248/171 X |
| 1,480,788 | 1/1924 | Sordillo | 248/171 X |
| 1,494,778 | 5/1924 | Enders | 248/171 X |
| 1,639,846 | 8/1927 | Green | 248/171 X |
| 2,646,956 | 7/1953 | Cadwell | 248/170 |
| 3,722,847 | 3/1973 | O'Connor | 248/188.3 X |
| 4,215,839 | 8/1980 | Gibran | 248/188.6 X |

Primary Examiner—J. Franklin Foss
Attorney, Agent, or Firm—Malin, Haley, McHale, DiMaggio & Crosby

[57] ABSTRACT

A tripod especially suited for use by a court reporter for supporting a court reporter's stenographic machine, the tripod providing an adjustable support leg that allows the stenographic machine to be firmly and stably supported in space at different locations relative to the court reporter for increased comfort and change of position by the court reporter throughout the day. In one embodiment, the leg includes an adjustable block and pin which provides several different positions relative to the supporting brace of that leg aligned for change in inclination of the overall support device.

11 Claims, 3 Drawing Sheets

TRIPOD

BACKGROUND OF THE INVENTION

1. Field of the Invention

This invention relates generally to improvements in tripod supports, and more particularly, to an improved tripod support for a stenographic machine typically used by a court reporter for transcribing testimony, the tripod permitting variations in the spatial orientations of the stenographic machine relative to the user to reduce muscular fatigue without reducing the stability of the tripod.

2. Description of the Prior Art

The use of tripods to support a shorthand machine is well known in the art. Because of the arduously long hours a user (such as a court reporter) must spend sitting in a fixed position relative to a stenographic (shorthand) machine, it is desirable to have a support structure for the stenographic machine which enables the user to adjust the machine to a variety of spatial positions relative to the user or the floor, thereby enabling changes from time to time of the physical position of the court reporter to provide more comfortable and variable shorthand machine operating positions which result in reduced fatigue and increased productivity.

Commensurate with this goal, a tripod support having an attachment for varying the angle of the supported shorthand machine has been developed, such as the invention disclosed in U.S. Pat. No. 4,889,301, issued to Yerkes. The Yerkes patent teaches the use of a conventional tripod base assembly having a central shaft end attached to a cantilevered support surface which may be vertically and angularly adjusted to suit the comfort zone of the user. However, by virtue of the cantilevered design, this type of support is incapable of providing a stable vibration free working surface due to the large bending moment developed by supporting the mass of the shorthand machine eccentrically relative to the central shaft axis.

Other types of tripod supports having angularly adjustable cantilevered support arms are disclosed in U.S. Pat. No. 2,593,075, issued to Dale, et al., U.S. Pat. No. 2,765,796, issued to Guenther and U.S. Pat. No. 4,671,478, issued to Schoenig, et al. It is significant that none of the aforementioned references suggest an angularly variable tripod support for a device without supporting the device in some kind of cantilevered arrangement.

Therefore, there exists a need for a tripod support apparatus having an adjustable feature to change the angular orientation of a central support shaft relative to a floor, whereby the supported object such as a stenographic machine may be conveniently positioned at different spatial locations without reducing stability and structural integrity of the tripod, especially for the benefit of a court reporter to allow for different body positions at desired intervals.

SUMMARY OF THE INVENTION

In accordance with the present invention, there is provided an improved support apparatus for sturdily but adjustably supporting a shorthand or stenographic machine at varying angles of incidence relative to the floor and especially the user.

The apparatus comprises a substantially vertical support for retaining a shorthand machine above a floor, which includes a main cylindrical rigid shaft defined by a first end and a second end, the shaft having a hollow bore extending therethrough for slidably mounting a secondary rigid cylindrical shaft therein. The secondary shaft has a coupling device at one end for secure attachment to a shorthand or stenographic machine of a known type, the coupling being used conventionally, and a flange at the other end of the secondary shaft for retention thereof within the main shaft. A locking mechanism comprising a first collar having a threadably contained friction locking screw is attached to the main shaft at its first end for engaging the secondary shaft by applying a normal friction load thereto which enables the secondary shaft to be slidably adjusted coaxially longitudinally relative to the main shaft, thereby enabling the user to obtain a comfortable working height for the stenographic machine.

The invention is achieved by the moveable positioning of at least one support leg to vary the spatial position of the shorthand machine without unfavorably affecting the stability of the tripod. In one embodiment, three rigid support legs for stable supporting and adjusting the upward orientation of the support shaft are each pivotally connected above and to the main shaft at its second end by a second collar having a plurality of integral flanges extending radially outward therefrom. The support legs may be fabricated having a "U-shaped" cross-sectional channel to facilitate attachment to the second collar and for reasons to be discussed hereinbelow. Attached to each rigid metal leg is a brace for sturdily securing each leg at a predetermined angular orientation relative to the main shaft. The brace comprises a thin planar elongated bar which is pivotally connected to a slidable third collar on the main shaft at one end, and the support leg at the other end. The slidable third collar has a spring-loaded locking pin normally biased against the main shaft so that it may be axially longitudinally aligned with a plurality of longitudinally disposed holes in the wall thickness of the main shaft such that the pin provides a bearing connection between the third collar and main shaft respectively. By pulling the pin radially outward, the third collar may be slid longitudinally relative to the shaft axis thereby collapsing the legs entirely for storage, or locking them in position at varying positions relative to the main shaft to adjust the overall length of the main upward support shaft to vary the height of the shorthand machine above the floor.

In accordance with one embodiment of the invention, at least one support leg has both a pivotal and slidable connection between its brace and the leg such that the leg brace pivot point therebetween may be varied with respect to the longitudinal axis of the adjustable leg. This action permits the adjustable leg to engage the main support shaft at an angle of incidence thereto which is variable from the other two legs depending on the location of the brace pivot joint along the adjustable leg. In this embodiment, the upward orientation of the entire assembly while supporting a stenographic machine may be altered with respect to the ground while maintaining a sturdy machine platform by distributing the supported mass through direct load path without the eccentric induced instability inherent in the "cantilevered type" prior art support devices as discussed.

The pivotal and slidable point connection between the brace and the adjustable leg is accomplished by pivotally attaching the brace to a block member which is slidably disposed within the "U-shaped" leg channel.

The block member has a clevis at one end for receiving the brace in a pivot joint, and a tab at the other end separated by a recessed body portion having a plurality of transverse slots defined therein. The tab end has a spring-loaded bias element situated between the block and the lower portion of the leg channel, which normally urges the slots in the intermediate body portion against a pin having a nominal width less than the slot width, which is rigidly attached to the side walls of the channel. In this manner, the braces are linearly fixed with respect to the leg by the bearing contact between the slotted block surface and the pin. To adjust the angular orientation of that particular leg relative to the other legs, human finger or foot pressure is applied to the block tab which permits the block to be slid within the leg "U-shaped" channel until an adjacent slot becomes axially aligned with the pin. Subsequently releasing pressure on the block tab allows the block to "snap" into place under load from the spring biasing means.

The invention may include other embodiments to accomplish support of the shorthand machine at various predetermined locations. For example, using a tripod and frame members as heretofore shown in general, alternate embodiments of the invention could include alteration of a single brace length for a single leg, alteration of the leg length itself and alteration of the leg and foot position with respect to the leg. Each of these embodiments would in effect change the upward angle of inclination and therefore the spatial position of a shorthand machine supported atop of the tripod with respect to a floor supporting the entire assembly. Other embodiments might include having multiple position attachments between the brace and main support shaft that can be readily moved at one end of the brace. Still another embodiment could include variable elements and components for securing the leg to the main cylindrical shaft at varying angles. Of primary concern however is to insure that there is no sacrifice of stability or sturdiness in the final support structure selected.

It is an object of the instant invention to provide an improved support apparatus for sturdily supporting a shorthand machine at a plurality of different spatial positions relative to a floor to improve the comfort of a court reporter.

It is another object of the invention to provide an improved tripod apparatus rigidly supporting a shorthand or stenographic machine at adjustably variable elevations relative to a support surface.

It is a further object of the invention to provide an improved tripod which is lightweight and easy to manufacture for adjustably supporting a court reporter's stenographic machine at different spatial orientations to permit different body positions, without reducing stability.

In accordance with these and other objects which will become apparent hereinafter, the instant invention will now be described with particular reference to the accompanying drawings.

DETAILED DESCRIPTION OF THE PREFERRED EMBODIMENT

Figure 1:
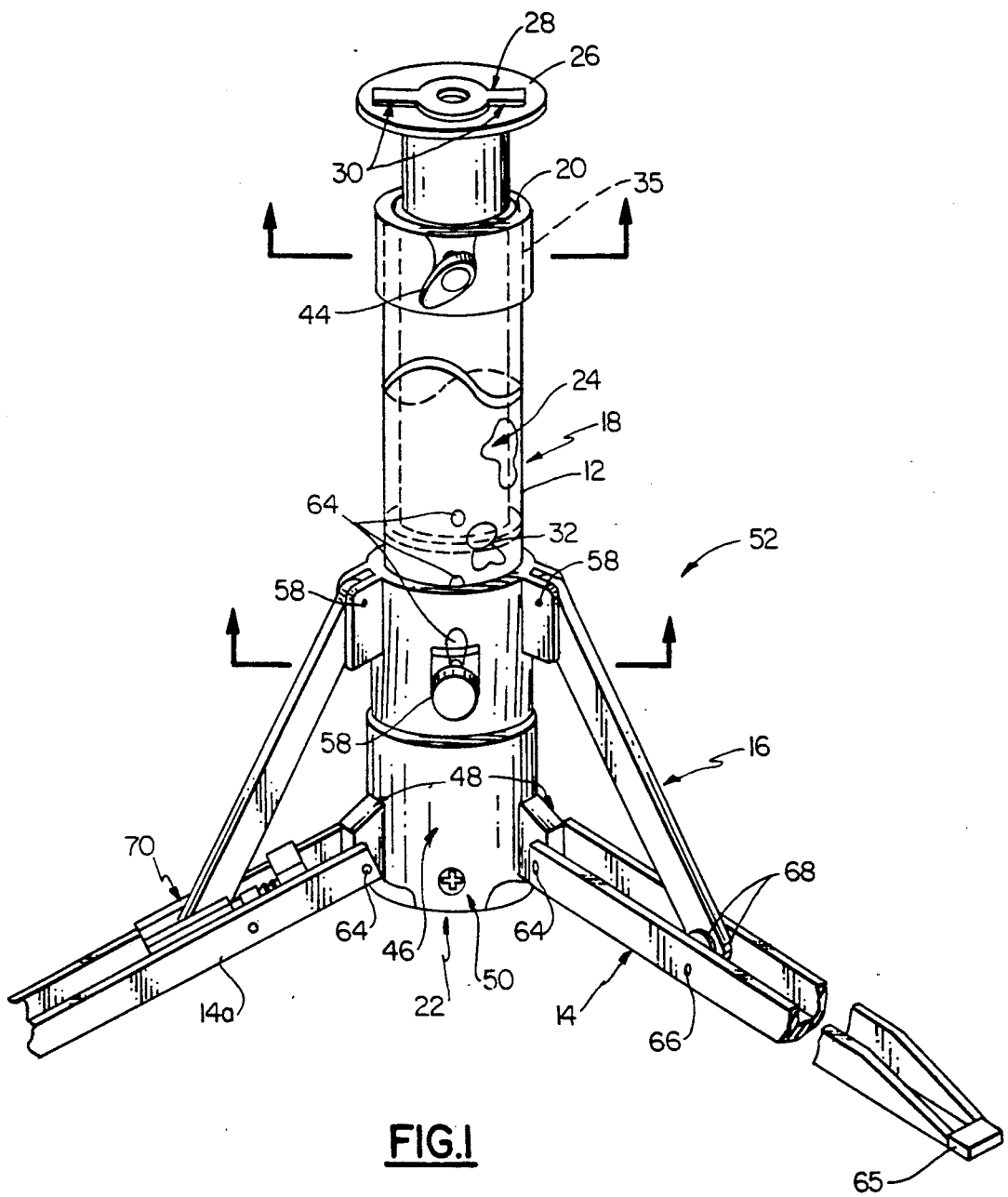
FIG. 1 is a perspective view of the tripod assembly in accordance with invention.
Figure 2:
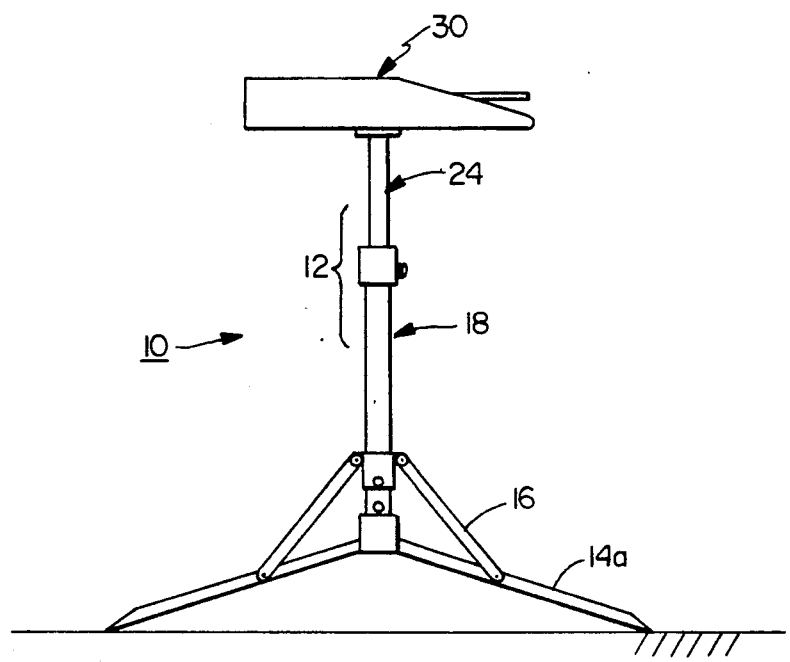
FIG. 2 is an elevational view of the tripod assembly supporting a machine in perpendicular orientation relative to a support surface.

With reference to the several views of the drawing, there is depicted an improved tripod support generally by reference numeral 10, comprising shaft housing 12, rigid legs 14, and leg braces 16.

In the preferred embodiment, shaft housing 12 comprises cylindrical main shaft 18 defined by a first end 20, a second end 22, and has a hollow bore extending therethrough. Slidably disposed coaxially within main shaft 18, is a secondary shaft 24 having a flange 26 at one end, a conventional shorthand machine, and retaining fitting 28, for rigidly securing a shorthand machine 30 thereto. Fitting 28 is a generally planar cylindrical member having opposing flange portions 30 which interconnect with a fastener affixed to shorthand machine 30 in a manner well known in the art. Secondary shaft 24 has a flange 32 at its opposite end for retaining itself within main shaft 18 by coming into contact with collar locking ring 34 which is slip-fit into first end 20 of main shaft 18, which will be described in greater detail hereinbelow.

Figure 5:
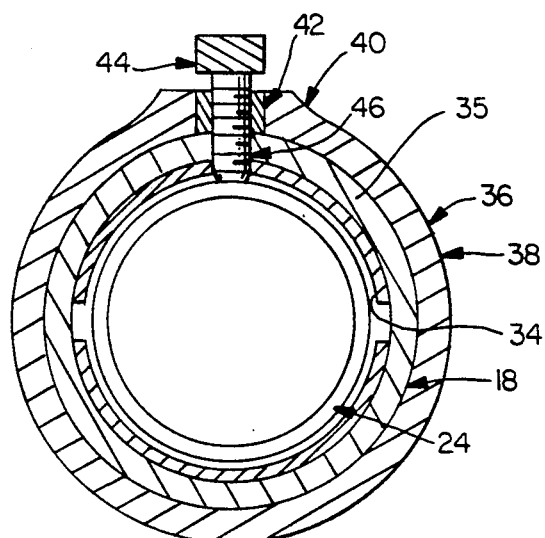
FIG. 5 is a section view through the shaft and extension adjustment collar.

At the first end 20 of main shaft 18, there is additionally provided a means for locking secondary shaft 24 relative to main shaft 18 such as first collar assembly 35, such that the axial longitudinal distance of the support shafts and therefore the height of shorthand machine 30 may be easily adjusted to suit the particular user. First collar assembly 35 comprises collar 36 which is defined by a cylindrical outer surface 38 terminating in a raised shoulder portion 40 for mounting a threaded insert 42 therein as shown in FIG. 5. A friction locking screw 44 is threaded into insert 42 and may be urged against secondary shaft 24 through hole 46 defined in main shaft 18. Collar assembly 35, which is slip fit on main shaft 18, and friction locking screw 44, in addition to providing a locking force to retain secondary shaft 24, prevents collar 36 from sliding out of position. Collar locking ring 34 is slip fit within the hollow bore of main shaft 18 and over collar 36, to engage flange 32 of secondary shaft 24 to retain it within main shaft 18.

A second collar assembly 46 is slip fit over the second end 22 of main shaft 18. Second collar assembly 46 has a plurality of flange portions 48 extending radially outward therefrom for pivotally joining rigid legs 14 thereto as will be described hereinafter. Second collar assembly 46 is rigidly secured to main shaft 18 by fastener 50 as shown in FIG. 1.

Figure 4:
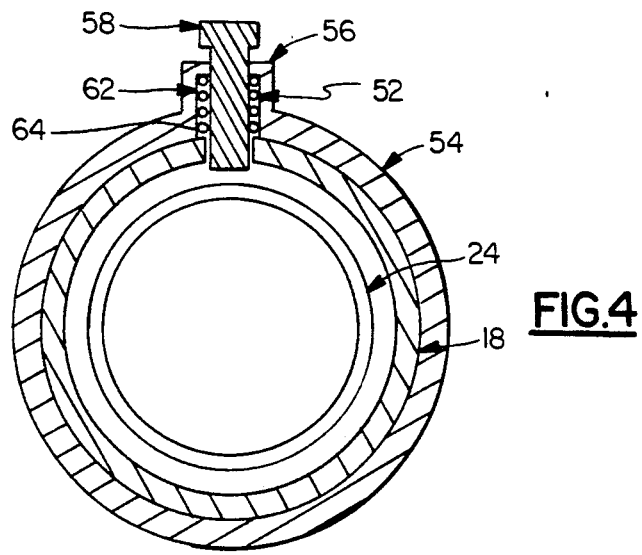
FIG. 4 is a section view through the shaft and brace collar.

A third collar assembly 52 is slip fit on main shaft 18 for pivotally and slidably attaching brace means 16 to main shaft 18. The third collar assembly 52 has a cylindrical outer surface 54 which has a raised shoulder portion 56 for mounting a spring loaded pin 58 therein. Shoulder portion 56 defines a hollow chamber 60 for mounting compression spring 52 between the shoulder and flange 64 on pin 58 as shown in FIG. 4. Pin 58 is biased by spring 62 against main shaft 18, so that it may be slip fit within one of a plurality of holes generally denoted by reference numeral 64 defined through the wall thickness of main shaft 18 to lock collar assembly 52 relative to main shaft 18, thereby adjusting the angular orientation of legs 14 relative to main shaft 18 as will be described below. Extending radially outward from the cylindrical outer surface 54 of collar assembly 52 are a plurality of clevis attachments 56 for receiving brace means 16 therein and pivotally attaching brace means 16 by pin 58.

The leg braces 16 are a plurality of elongated rigid metal planar bars which support legs 14 relative to main shaft 18. Each brace 16 is pivotally attached to third collar assembly 52 as described above, and is pivotally attached to the legs 14 as described hereinafter.

The tripod support legs 14 are constructed in the form of a "U-shaped" channel 61 in the preferred embodiment which is defined by a planar bottom wall 60 joined by two planar and parallel side walls 62a and 62b at substantially right angles thereto. Each leg 14 is pivotally connected to collar 46 by pin 64 through flanges 48 at one end as described above and has an elastomeric tab 65 to prevent floor damage at its other end. Braces 16 are pivotally connected to legs 14 by pin 66 and spacer 68, and pivotally and slidably connected to leg 14a by block member 70.

Figure 3:
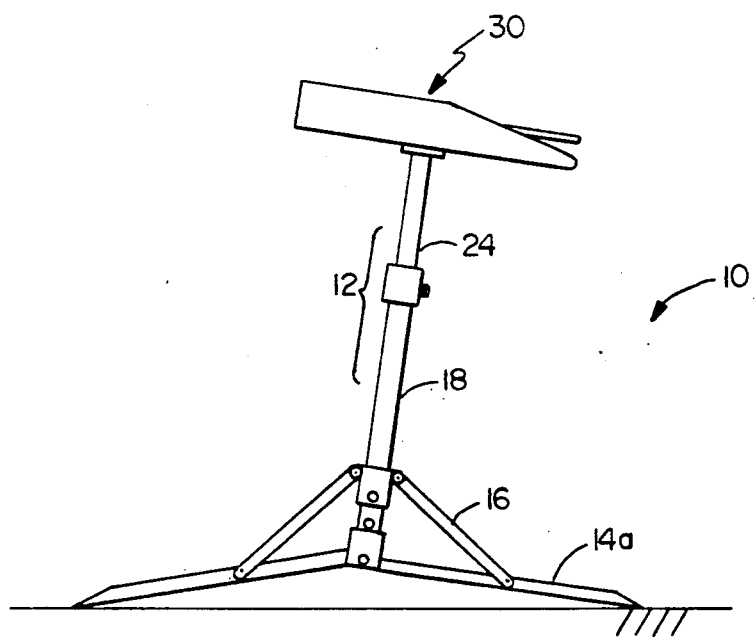
FIG. 3 is an elevational view of the tripod assembly supporting a shorthand machine at an acute angle relative to the support surface.
Figure 6:
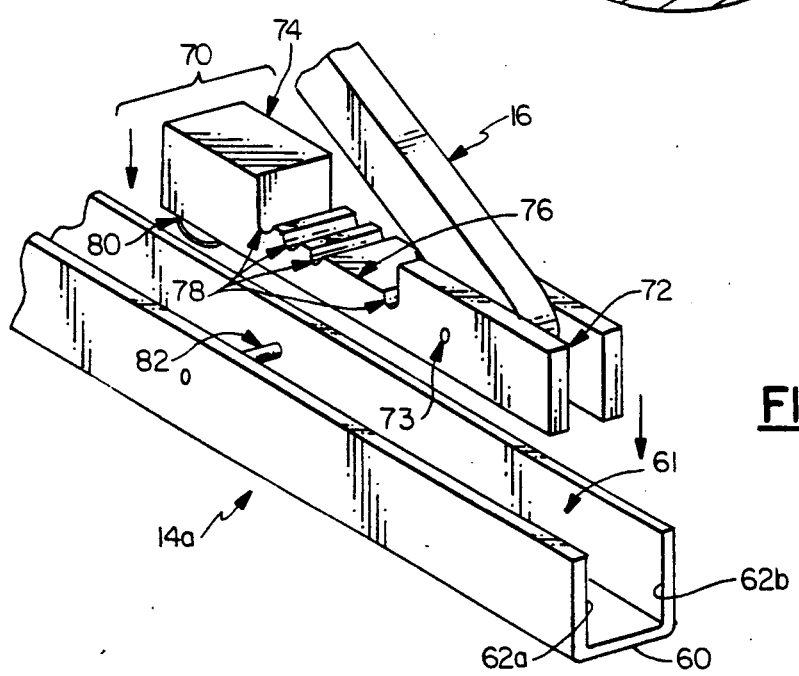
FIG. 6 is a perspective view of the sliding block member.

At least one leg 14a, and brace 16a, are joined in a pivotal and slidable connection by block member 70 located within channel 61, such that the pivot point may be linearly translated relative to the leg 14a to vary the angle of that particular leg 14a relative to the other legs 14 to incline the entire tripod assembly 10 at an acute angle relative to the ground or a floor support surface as shown in FIG. 3. FIGS. 1 and 6 depict block member 70 having a clevis 72 at one end for receiving brace 16 in a pivot joint secured by pin 73, and a tab 74 at the other end separated by a recessed body portion 76 having a plurality of transverse slots 78 defined therein. Tab end 74 has a spring loaded biasing means 80 disposed between block 70 and the leg planar bottom 60 in channel 61 which normally urges slotted recessed body portion 76 against pin 82. Pin 82 has a nominal width less than the width of slot 78 and is situated a distance greater than the thickness of recessed body portion 76 above planar bottom wall 60 and between walls 62a and 62b, thereby facilitating bearing contact between pin 82 and block 70 to rigidly and adjustably secure brace 16 to leg 14a. To change the location of the pivot point relative to leg 14a, finger or foot pressure on tab 74 against spring loaded biasing means 80 permits block member 70 to be slid relative to pin 82 so that block 70 may engage pin 82 via a different slot 78. By axially aligning adjacent slots 78 with pin 82, the angle of the tripod assembly 10 may be varied while still providing a vibration free and stable support surface for a shorthand machine 30. Tab 74 is constructed so that the tab 74 extends above the U channel of leg 14a so that the tab can be actuated by the user's foot to change positions of the shorthand machine.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An apparatus for sturdily supporting a shorthand machine above a floor, said apparatus being adjustable for changing the spatial position of the supported shorthand machine, comprising:

shaft means having a first end and a second end;

shorthand machine connector affixed to said shaft means first end;

plurality of leg means pivotally connected to said shaft means at said shaft second end for supporting said shaft means in an upward orientation relative to said floor;

plurality of brace means for supporting said plurality of leg means in angular orientation relative to said shaft means, and said brace means connected to said leg means; and finger of foot activated means attached to at least one of said plurality of leg means for movably changing said connection between said brace means and said leg means relative to said leg means, whereby said shaft means may be angularly adjusted relative to said floor while providing a rigid and stable support for said shorthand machine.

2. An apparatus in claim 1, wherein:

said brace means being adjustably and pivotally connected to said leg means, and pivotally and slidably connected to said shaft means.

3. The apparatus related in claim 2, wherein said shaft means defines a cylindrical outer surface, said outer surface further defining a plurality of axially spaced holes normal thereto.

4. The apparatus recited in claim 3, wherein said pivotal and slidable connection between said brace means and said shaft means comprises:

collar having a nominal wall thickness slidably disposed on said shaft means, said collar defining a hole normal to and through said wall thickness;

pin having a cylindrical body portion slidably disposed in said collar hole, said pin further having a flange around said cylindrical body portion for retaining said pin within said collar; and spring biasing means between said pin flange and said collar for urging said pin against said shaft means, whereby said collar may be slidably translated relative to said shaft means and fixedly secured with respect thereto when said point comes into axial alignment with said shaft means holes.

5. The apparatus recited in claim 2, wherein said leg means comprises a leg member having a planar bottom portion joined by two planar and parallel side portions at substantially right angles thereto so as to define a "U-shaped" channel therein.

6. The apparatus recited in claim 2, wherein said shaft means comprises:

an elongated main shaft defining a hollow bore extending therethrough;

an elongated secondary shaft slidably and coincidentally disposed with said hollow bore of said main shaft, said secondary shaft having a retaining flange at its first end to prevent it from sliding out of said main shaft, and a second end; and connecting means at said second end of said secondary shaft for rigidly securing said shorthand machine thereto.

7. The apparatus recited in claim 6, further comprising locking means attached to said main shaft for adjustably securing said secondary shaft relative to said main shaft so as to adjustably elevate said shorthand machine above said support surface.

8. The apparatus recited in claim 7, wherein said locking means comprises:

a collar rigidly attached to said main shaft, said collar having a nominal side wall thickness;

an insert secured within said collar side wall thickness; and a screw member threadably disposed within said insert for frictionally engaging said secondary shaft to fixedly secure said secondary shaft relative to said main shaft.

9. An adjustable stand for supporting a shorthand machine at various spatial locations relative to a floor and a user, said stand including:

a frame assembly, said frame assembly including a plurality of rigid supporting members and a shorthand machine connector attached at the uppermost location of said stand for attachment of said frame sturdily to a shorthand machine;

a plurality of legs each leg attached at one end to said frame at a pivot point, each leg having an end supporting foot;

means to secure each of said supporting feet on each leg at an angle defined by said connector, said leg frame pivot point and said supporting foot;

foot or finger activated means to alter said defined angle of at least one of said feet of said one leg; and means to secure said altered foot at said altered angle.

10. A device as in claim 9, including:

a plurality of braces, each attached to a different leg between the frame and the leg to brace the leg and frame together, at least one brace being adjustably attached to said leg having an adjustable defined angle to allow the shorthand machine to be oriented at different spatial positions by adjustment of the brace position relative to a single leg.

11. An apparatus for sturdily supporting a shorthand machine above a floor, said apparatus being adjustable for changing the spatial position of the supported shorthand machine, comprising:

shaft means having a first end and a second end;

shorthand machine connector affixed to said shaft means first end;

plurality of leg means pivotally connected to said shaft means at said shaft second end for supporting said shaft means to an upward orientation relative to said floor, said leg means comprises a leg member having a planar bottom portion joined by two planar and parallel side portions at substantially right angles thereto so as to define a "U-shaped" channel therein;

plurality of brace means for supporting said plurality of leg means in angular orientation relative to said shaft means, and said brace means connected to said leg means, said brace means being adjustably and pivotally connected to said leg means, and pivotally and slidably connected to said shaft means;

means attached to at least one of siad plurality of leg means for movably changing said connection between said brace means and said leg means relative to said leg means, said means for movably changing said pivotal connection between said brace means and said leg means relative to said leg means having an elongated block member slidably disposed in said leg member of "U-shaped" channel having a slotted first end which defines a clevis for pivotally attaching said brace means therein, and a second end connected to said first end via a recessed intermediate body portion, said body portion defining a plurality of transverse slots therein;

a pin member transversely disposed within said leg member "U-shaped" channel a distance above said planar bottom portion and rigidly secured between said parallel side portions; and spring biasing means for normally urging said block member intermediated body portion respective transverse slots against said pin member to rom a rigid connection therebetween, whereby said pivotal connection between said brace means and said leg means may be translated relative to said leg means by depressing said block members second end and sliding said block within said leg member "U-shaped" channel such that said respective block slot may be coincidentally aligned with said pin member;

whereby said shaft means may be angularly adjusted relative to said floor while providing a rigid and stable support for said shorthand machine.

* * * * *